Feb. 11, 1936.     R. LOWE     2,030,381
APPARATUS FOR METERING FLUIDS
Filed June 30, 1933     2 Sheets-Sheet 1
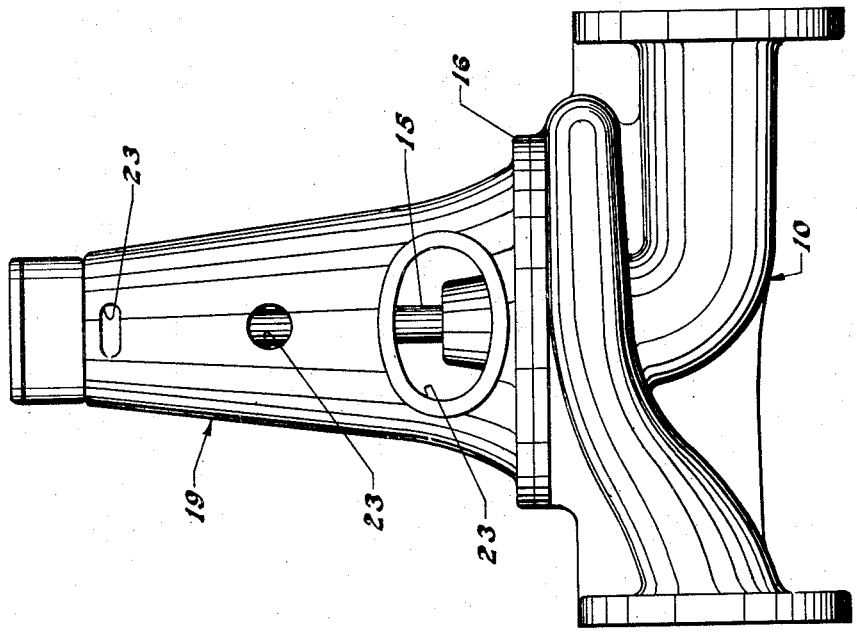
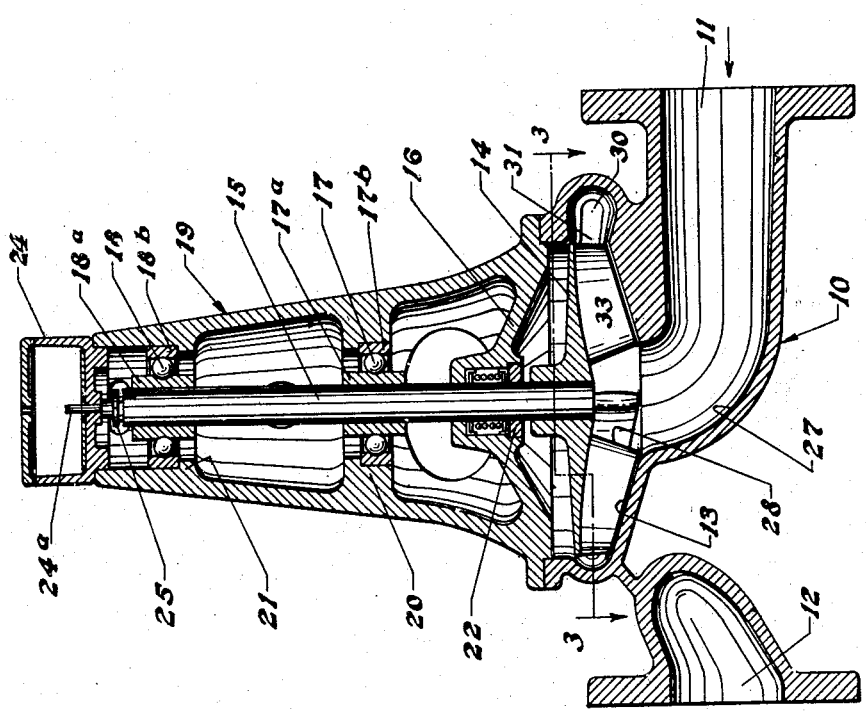
Inventor
Rudy Lowe
By Ferd Bing
Attorney

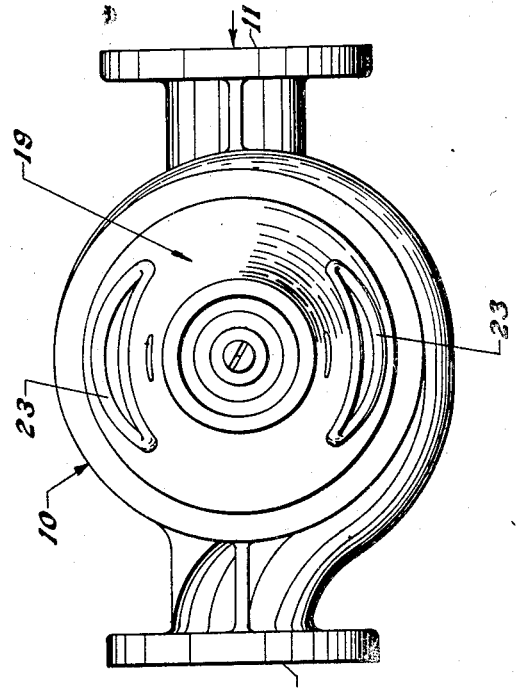
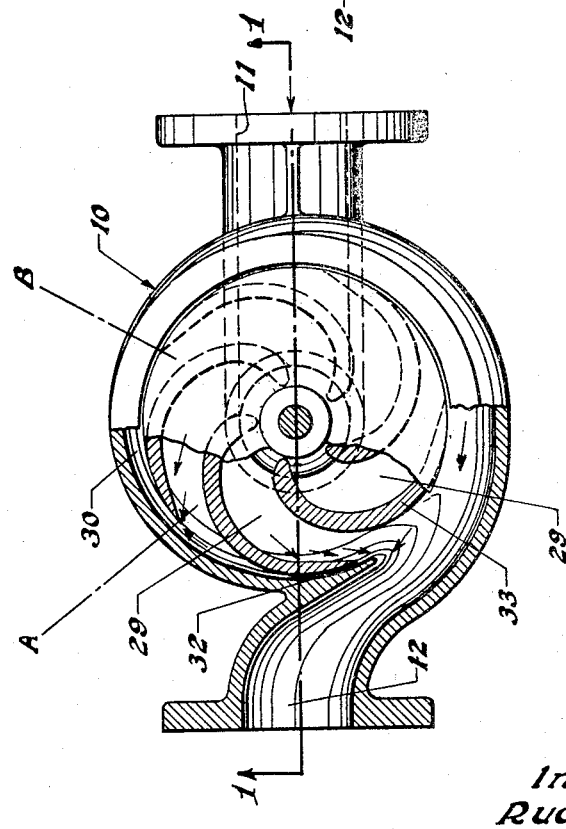

UNITED STATES PATENT OFFICE 2,030,381

APPARATUS FOR METERING FLUIDS

Rudy Lowe, Chicago, Ill., assignor to Proportioneers, Inc., Providence, R. I., a corporation of Rhode Island Application June 30, 1933, Serial No. 678,538

2 Claims. (Cl. 73—37)

The invention relates generally to the art of metering and more particularly it is concerned with the class of flow responsive devices wherein rotation results from the reaction of the moving fluid as distinguished from such devices which operate on either a strict impact or volume displacement principle.

Flow responsive devices of this character are customarily used in closed conduits for metering the fluid passing through such conduits, and for such uses prior devices operating on the reaction principle have, in practice, been found to be objectionable for the reason that the rate of rotation of the rotor does not vary in direct proportion to the rate of flow of the fluid. These prior devices have also been objectionable because of the excessive machine wear incident to the high speed of the devices and also because of the difficulty encountered in utilizing the high speed rotation of the rotor.

While fluids metered by flow responsive devices of this character are generally of a uniform density or specific gravity, it is found that in some installations, the specific gravity varies considerably, hence a strict volumetric metering of the liquid fails to give satisfactory results, particularly when the flow responsive device is used as a governing means for proportioning apparatus.

An important object of the invention is to provide a flow responsive device of this character wherein the rotor is actuated in a constant ratio to the rate of flow over a wide range of variation in such rate.

Another object is to provide a metering device of this character operable to compensate for variations in the specific gravity of the fluid metered, whereby the device serves, in effect, as a means for determining the weight of such metered fluid.

Another object of the invention is to provide such a device wherein the rate of rotation of the rotor is relatively low with respect to the rate of flow of the fluid.

Another object is to provide such a device adapted for metering relatively heavy and slow moving fluids such as sludge.

Another object is to provide a flow responsive device of this character adapted for handling corrosive, abrasive or high temperature fluids.

The above and other objects are attained in the present embodiment through the provision of a structure wherein the fluid upon being discharged from the rotor, reacts against a predetermined and uniform counter-flow of the fluid previously discharged from the rotor, whereby the reacting forces which impel the rotor act against moving fluid rather than against fixed vanes.

Other objects and advantages will become apparent from the following description taken in connection with the accompanying drawings which show a preferred embodiment of the machine for carrying out the invention, and in which:

Fig. 1 is a central sectional view of a flow responsive device embodying the features of the invention, the view being taken substantially along the line 1—1 of Fig. 3.

Fig. 2 is a side elevational view of the device.

Fig. 3 is a transverse sectional view taken substantially along the line 3—3 of Fig. 1.

Fig. 4 is a top plan view of the device with the gear box removed.

In the practice of the invention, a flow responsive device is employed, which in the preferred form chosen for disclosure, comprises a hollow casing 10, with alined inlet and outlet ports 11 and 12, at opposite sides thereof, and having a rotor chamber 13 formed therein. Within the chamber 13 a relatively flat disk-like rotor 14 is suspended by means of a shaft 15, the shaft extending upwardly from the rotor through a removable cover plate 16 which closes the top of the chamber 13 and serves to complete the casing 10.

In order to adapt the device for use with corrosive, abrasive, viscous or high temperature fluids, the rotor 14 is supported by the shaft 15 which has longitudinally spaced bearings 17 and 18 (Fig. 1) located outside of the rotor chamber 13. These bearings act as both radial and thrust bearings for the shaft 15. To support the bearings 17 and 18, the cover plate 16 has integrally formed therewith a generally tubular standard 19 centered on the axis of the rotor and having longitudinally spaced transverse webs 20 and 21 in which the bearings 17 and 18 are mounted. These bearings are preferably of the antifriction type, such as the ball bearings herein shown, with inner races 17ª and 18ª respectively, fixed to the shaft 15, and outer races 17ᵇ and 18ᵇ respectively, engaging oppositely disposed thrust shoulders formed on the webs 20 and 21.

Below the bearings 17 and 18 and in the cover plate 16, a seal ring 22 of conventional form is provided to prevent escape of fluid from the chamber about the shaft 15. Preferably the standard 19 has a plurality of openings 23 formed therein whereby access may be had to the bearings 17 and 18 and the stuffing box including seal ring 22 for purposes of inspection, oiling or the like.

At its upper end the shaft 15 is exposed above the bearing 18 for attachment to the mechanism which is to be actuated by the device. Thus, in the present instance, a gear box 24 is mounted on the open upper end of the standard 19 in closing relation thereto, with a power take-off shaft 24ª projecting downwardly from the box in alinement with the shaft 15 and associated therewith by means of a conventional connector 25.

In accordance with the present apparatus, the fluid flowing through the casing is so directed that reacting forces tending to impel the rotor are set up by counter-flow of the fluid, that is, by reaction between a first stream of fluid, flowing through the casing in direct contact with and substantially tangentially of the rotor, and a stream or a plurality of streams of fluid flowing through the rotor into the first stream at an angle to the path of flow of the first stream.

Thus, in the present embodiment of the invention, the inlet port 11 has a passage 27 which leads the fluid to the central axis of the rotor on the lower side thereof, at which point the passage 27 extends upwardly and discharges the fluid into the open lower end of a central chamber 28 formed in the rotor 14. From the chamber 28, the fluid preferably flows toward the periphery of the rotor 14 through a plurality of openings or ducts 29 which are formed in the rotor and extend in a generally radial direction to the periphery thereof. The ducts 29 are similar in form and size, and are equidistantly spaced in a peripheral direction so as to discharge the fluid from the periphery of the rotor in a plurality of equidistantly spaced streams of equal size.

About the periphery of the rotor 14, the casing 10 is formed to provide a passage 30, one side of which is open as at 31 so that the ducts 29 open and discharge directly into an unobstructed portion of the passage 30. The passage 30 is closed at one end as shown at 32, while its other end communicates with the outlet port 12 so that the fluid, discharged into the passage from the ducts 29 of the rotor, flows through the passage 30 and to the outlet port 12 and continues its movement through the pipe line in which the device is connected.

As shown in Fig. 3, the passage 30 is generally arcuate in horizontal cross section so that the fluid therein flows along a path of relatively great length in direct contact with an external surface of the rotor 14. The fluid thus flowing through the passage is supplied by the ducts 29 of the rotor, a plurality of such ducts being in communication with the passage 30 at all times. Hence, the stream of fluid discharged from each of the rotor ducts 29 flows into the passage 30 at an angle to the longitudinal axis of the passage (Fig. 3), and into a counter-flow of fluid moving in a peripheral direction with respect to the rotor. It will be evident in Fig. 3 of the drawings that the outer or discharge ends of the ducts 29 are formed to provide deflecting surfaces on the leading side of the ducts (that is the trailing side of the blades or fins 33 which form the sides of the ducts), which surfaces are substantially centered on the axis of the rotor so as to direct the fluid from the ducts toward the closed end of the passage 30.

By reason of the reaction between the opposed streams of fluid, an impelling force is exerted on the rotor 14 as will be apparent from a consideration of force diagram shown in Fig. 3 of the drawings. This impelling force is a direct function of the rate of flow of the fluid through the casing 10, and hence the rate of rotation of the rotor 14 varies in direct proportion to the rate of flow of the fluid.

Since the impelling force is created by an interfluid reaction, such force is dependent upon and varies in direct proportion to the specific gravity of the fluid being metered. This variation is, of course, immaterial in most instances since the specific gravity of the fluid is usually constant, but where there is such variation, the present device responds to the variation in the rotor-impelling force so as to produce a compensating effect by reason of which the rotor movement becomes a function of the fluid weight.

Preferably the cross sectional area of the passage 30 is gradually increased from its closed end 32 to the other end which connects with the outlet port. In the present instance, the passage 30 takes the form of a volute or torus which increases gradually in cross sectional area in a definite relation to the area and spacing of the ducts 29. Thus the cross sectional area of the passage 30 at the point A is equal to the area of one duct 29, it being apparent that one such duct may be positioned between the point A and the closed end 32 of the passage. Similarly, at the point B, the area of the passage 30 is equal to the area of two of the ducts 29, since two such ducts may be located between the point B and the end 32 of the passage. The same ratio is maintained throughout the entire length of the passage 30 and hence the velocity of the fluid in the passage is uniform throughout the entire length of the passage, and the same rotor-impelling reaction is developed at each discharge duct 29.

The velocity of the fluid in the passage 30, of course, changes in accordance with the rate of flow of the fluid through the conduit system, but in such variation, the velocity in the passage bears a constant ratio to the rate of flow. As the velocity of the fluid in the passage 30 varies, the reacting forces which impel the rotor 14 are correspondingly varied so as to actuate the rotor in direct proportion to said velocity, and hence in direct proportion to the rate of flow of the fluid through the conduit system.

In the embodiment illustrated herein, the ducts 29 are formed so as to have a constant cross sectional area from the central chamber 28 to the periphery of the rotor, the horizontal width of the ducts being increased (Fig. 3) toward the periphery to compensate for the reduction in the vertical dimension (Fig. 1). For purposes of economy, the bottom wall of the ducts 29 may be formed by the lower wall of the rotor chamber 13, in which case, the rotor is simplified and consists merely in a top plate or disk with a series of depending fins 33.

By employing the apparatus herein disclosed, accurate metering of the fluid is obtained even though the rate of flow varies over a wide range. Moreover, the apparatus is such that variations in the specific gravity of the liquid are reflected in the results obtained, so that the apparatus constitutes, in its practical effect, an apparatus weighing a flowing stream of fluid of varying specific gravity.

The flow responsive unit disclosed has, in practice, been found to be rugged, accurate and capable of use in connection with a wide variety of fluids. Its operating characteristics have been found to be the same in a large range of sizes, thus simplifying the design and adaptation for new installations. Its relatively low rate of rotation, of course, reduces wear of the parts and simplifies its use, and in addition, permits its use with relatively viscous fluids. The external bearings adapt it for use with corrosive, abrasive and high temperature fluids so that the device has utility in a wide field.

I claim as my invention:

1. A flow responsive device comprising, in combination, a casing having inlet and outlet ports and a rotor chamber, a rotor in said chamber, said casing having an unobstructed passage formed therein centered on the axis of said rotor and having one side opening into said rotor chamber so that one side of said rotor moves along the unobstructed side of the passage, and said passage being closed at one end and connected at its other end to said outlet port and the cross sectional area of said passage being gradually increased from the closed end to the large end thereof which is connected to said outlet port, and said rotor having ducts formed therein each communicating at one end with said inlet opening and at the other end with said passage, said ducts having their leading sides formed with surfaces which are substantially centered on the axis of said rotor so as to direct the fluid from the ducts toward the closed end of said passage.

2. A fluid metering device comprising, in combination, a casing having inlet and outlet openings, and a rotor chamber, said casing having a torus shaped passage formed therein opening along one side into said chamber and being closed at one end and communicating at its other end with said outlet opening, said rotor chamber opening axially through one wall of said casing, a closure plate for said open side of the rotor chamber, a bearing supporting structure carried by the outer side of said plate, a rotor positioned in said chamber and having a plurality of ducts therein communicating with said inlet opening and discharging into said passage in the direction of the closed end thereof, a shaft to which said rotor is fixed, said shaft projecting through said plate into said bearing supporting structure, and radial and thrust bearings mounting said shaft in said bearing supporting structure.

RUDY LOWE.